US009177468B2

(12) United States Patent
Dirksen et al.

(10) Patent No.: US 9,177,468 B2
(45) Date of Patent: Nov. 3, 2015

(54) ULTRASONIC TRANSMISSION / RECEPTION FOR ELECTROMAGNETIC TRANSMISSION RECEPTION

(75) Inventors: Peter Dirksen, Valkenswaard (NL); Willem Franke Pasveer, Dordrecht (NL)

(73) Assignee: Koninklijke Philips N.V., Eindhoven (NL)

(*) Notice: Subject to any disclaimer, the term of this patent is extended or adjusted under 35 U.S.C. 154(b) by 1174 days.

(21) Appl. No.: 13/059,432

(22) PCT Filed: Aug. 14, 2009

(86) PCT No.: PCT/IB2009/053595

§ 371 (c)(1), (2), (4) Date: Feb. 17, 2011

(87) PCT Pub. No.: WO2010/023588

PCT Pub. Date: Mar. 4, 2010

(65) Prior Publication Data

US 2011/0156863 A1 Jun. 30, 2011

(30) Foreign Application Priority Data

Aug. 25, 2008 (EP) .................................... 08105121

(51) Int. Cl.
*G06F 7/04* (2006.01)
*G01S 3/808* (2006.01)
(Continued)

(52) U.S. Cl.
CPC ............ *G08C 23/02* (2013.01); *G07C 9/00111* (2013.01); *G08C 17/02* (2013.01);
(Continued)

(58) Field of Classification Search
CPC ........................................................ G06F 7/04
USPC ............ 340/5.1–5.21, 5.8, 943, 384.2, 573.1, 340/573.4, 10.1–10.5; 367/128, 127; 379/90.01, 102.01, 102.03
See application file for complete search history.

(56) References Cited

U.S. PATENT DOCUMENTS 6,433,689 B1 * 8/2002 Hovind et al. ............ 340/573.1
6,470,002 B1 * 10/2002 Jones et al. .................. 370/345
(Continued)

FOREIGN PATENT DOCUMENTS

JP 2001127666 A 5/2001
JP 2004178338 A 6/2004
(Continued)

*Primary Examiner* — Nam V Nguyen
(74) *Attorney, Agent, or Firm* — Meenakshy Chakravorty

(57) ABSTRACT

First apparatuses (10) such as tags and batches comprise receivers (11) for receiving ultrasonic signals (1) comprising first codes from sources (27, 30), analyzers (12) for analyzing first codes, transmitters (13) for transmitting electromagnetic signals (2) comprising second codes to second apparatuses (20), and controllers (14) for, in response to analysis of first codes, controlling at least parts of the first apparatuses (10), such as modes, transmissions, and supplies of second codes. Second apparatuses (20) such as parts of interfaces and parts of stations comprise receivers (21) for receiving the electromagnetic signals (2) comprising second codes from the first apparatuses (10), analyzers (22) for analyzing second codes, and generators (23) for, in response to analysis of second codes, generating parameter signals (5) defining issues like registration issues and authorization issues and environmental issues, and analysis results. The first apparatuses (10) may form part of first devices (100) such as mobile phones and organizers, and the second apparatuses (20) may form part of second devices (200) such as interfaces and stations.

14 Claims, 4 Drawing Sheets

(51) Int. Cl.

| | |
|---|---|
| ***G08B 23/00*** | (2006.01) |
| ***G08C 23/02*** | (2006.01) |
| ***G07C 9/00*** | (2006.01) |
| ***G08C 17/02*** | (2006.01) |
| *G07C 1/10* | (2006.01) |

(52) U.S. Cl.
CPC ....... *G07C 1/10* (2013.01); *G07C 2009/00801* (2013.01); *G08C 2201/20* (2013.01); *G08C 2201/91* (2013.01); *G08C 2201/93* (2013.01)

(56) References Cited

U.S. PATENT DOCUMENTS

| | | | | |
|---|---|---|---|---|
| 6,720,876 | B1 | 4/2004 | Burgess | |
| 7,061,381 | B2 * | 6/2006 | Forcier et al. | 340/572.2 |
| 7,242,306 | B2 | 7/2007 | Wildman et al. | |
| 7,362,656 | B2 | 4/2008 | Holm | |
| 7,498,946 | B2 * | 3/2009 | Forcier et al. | 340/572.2 |
| 8,508,401 | B1 * | 8/2013 | Patel et al. | 341/176 |
| 8,509,400 | B2 * | 8/2013 | Liu et al. | 379/90.01 |
| 2008/0061967 | A1 | 3/2008 | Corrado | |

FOREIGN PATENT DOCUMENTS

| | | | |
|---|---|---|---|
| JP | 2006086584 | A | 3/2006 |
| JP | 2006266570 | A | 10/2006 |
| WO | 2004057361 | A1 | 7/2004 |
| WO | 2004100395 | A1 | 11/2004 |

* cited by examiner

ULTRASONIC TRANSMISSION / RECEPTION FOR ELECTROMAGNETIC TRANSMISSION RECEPTION

FIELD OF THE INVENTION

The invention relates to a first apparatus for communication with a second apparatus, and also relates to a second apparatus for communication with a first apparatus, and to a communication method.

Examples of such a first apparatus are receiver transmitter combinations for receiving ultrasonic signals and transmitting electromagnetic signals, such as tags and batches, and examples of such a second apparatus are receivers for receiving electromagnetic signals, such as parts of interfaces and parts of stations.

BACKGROUND OF THE INVENTION

U.S. Pat. No. 7,362,656 B2 discloses an ultrasonic locating system. This system uses transmission units (sources) for transmitting different encoded ultrasonic pulses. The system further uses a tag (first apparatus) for receiving the different encoded ultrasonic pulses and for transmitting radio signals. These radio signals comprise calculated arrival times for the received ultrasonic pulses and comprise tag identifications. The system also uses a server (second apparatus) for receiving the radio signals and for updating its database. This system is designed for a purpose of determining a location of a tag.

SUMMARY OF THE INVENTION

It is an object of the invention to provide an improved first apparatus that can be used for more and/or other purposes. It is a further object of the invention to provide an improved second apparatus that can be used for more and/or other purposes. It is a yet further object of the invention to provide an improved method.

According to a first aspect, a first apparatus for communication with a second apparatus is provided, the first apparatus comprising a receiver for receiving an ultrasonic signal comprising a first code from a source, an analyzer for analyzing the first code, a transmitter for transmitting an electromagnetic signal comprising a second code to the second apparatus, and a controller for, in response to an analysis of the first code, controlling at least a part of the first apparatus.

A receiver receives an ultrasonic signal comprising a first code from a source. An analyzer analyzes the first code, and a transmitter transmits an electromagnetic signal comprising a second code to a second apparatus, for example in response to a reception of the ultrasonic signal. By further providing the first apparatus with a controller for, in response to an analysis of the first code, controlling at least a part of the first apparatus, the first apparatus has become capable of deciding itself how to react to a reception of the ultrasonic signal comprising the first code. As a result, more and/or other purposes than location determination have become possible.

In U.S. Pat. No. 7,362,656 B2, the tags react to receptions of the ultrasonic pulses by calculating arrival times for the received ultrasonic pulses. The tags do not analyze the transmission unit identifications (the encodings of the ultrasonic pulses), but the tags only forward these transmission unit identifications together with the calculated arrival times and the tag identifications to the server.

The first code in the ultrasonic signal may be a code added to the signal (for example through on/off modulation etc.) or may be a code implemented in the signal (preferably for example through frequency modulation or phase modulation or otherwise for example through selection of frequency, amplitude, power etc.). The electromagnetic signal may be an optical signal but will preferably be a radio frequency signal. The second code in the electromagnetic signal may be a code added to the signal (for example through modulation etc.) or may be a code implemented in the signal (for example through selection of frequency, amplitude, power etc.). More than one first code and one or more additional codes in the ultrasonic signal are not to be excluded. More than one second code and one or more additional codes in the electromagnetic signal are not to be excluded.

According to an embodiment, the first apparatus is defined by said controlling of at least the part of the first apparatus comprising a control of a mode of the first apparatus, the first apparatus having at least a power saving mode and a power consuming mode. In this case, the analysis of the first code for example allows the first apparatus to decide to go from a power saving mode to a power consuming mode, for example a wake—up of a wireless sensor device for a first amount of time or until a next ultrasonic signal comprising the first code or another code is received.

According to an embodiment, the first apparatus is defined by said controlling of at least the part of the first apparatus comprising a control of the transmitter for, in response to a reception of the ultrasonic signal, transmitting the electromagnetic signal comprising the second code to the second apparatus. In this case, the analysis of the first code for example allows the first apparatus to decide to activate its transmitter for transmitting the electromagnetic signal, for example immediately or after a second amount of time, and for example for a third amount of time or until a next ultrasonic signal comprising the first code or another code is received.

According to an embodiment, the first apparatus is defined by further comprising a supplier for supplying the second code, said controlling of at least the part of the first apparatus comprising a control of the supplier, said second code comprising an identification code and/or a unique code and/or the first code and/or a link to the first code and/or an analysis result. In this case, the analysis of the first code for example allows the first apparatus to decide to activate its supplier for supplying the second code, for example immediately or after a fourth amount of time, and for example allows the first apparatus to decide to program its supplier for selecting the second code, for example in dependence of the first code and/or in dependence of another feature such as a date or a time etc. The second code may for example comprise an identification code (an identification of (a user of) the first apparatus) or a unique code (unique within the system) and may for example further comprise the first code or a link to this first code or an analysis result etc.

According to an embodiment, the first apparatus is defined by said analysis of the first code comprising a comparison. In a simple case, the first code is only compared with one or more other codes. In more advanced cases, the first code is processed and then compared with one or more other codes or the first code is compared with one or more other processed codes or the first code is processed and then compared with one or more other codes processed. A comparison may comprise one or more calculations of functions of one or more codes etc.

According to an embodiment, the first apparatus is defined by further comprising a further receiver for receiving a further electromagnetic signal comprising a third code from the second apparatus, the transmitter being arranged for, in response to a reception of the further electromagnetic signal, transmitting a yet further electromagnetic signal comprising a fourth code to the second apparatus. In this case, the first apparatus firstly transmits the electromagnetic signal comprising the second code to the second apparatus. In response, the second apparatus secondly transmits the further electromagnetic signal comprising the third code to the first apparatus. In response, the first apparatus thirdly transmits the yet further electromagnetic signal comprising the fourth code to the second apparatus. This for example allows a challenge-sign-response mechanism to be used for authentication purposes etc. Before secondly (thirdly) transmitting, an analysis of the second (third) code may be performed.

According to a sub-aspect, a first device comprising the first apparatus is provided. Such a first device may be a handheld device such as a mobile phone, a wireless sensor device or an organizer etc. in which case a user cannot forget the tag or batch as long as the user has the handheld device with him. The first device may be a laptop or a desktop such as a personal computer etc. or may be a living room device or a kitchen device or an office device etc. in which case this first device can be monitored and for example prevented from being stolen.

According to a second aspect, a second apparatus for communication with a first apparatus is provided, the second apparatus comprising a receiver for receiving an electromagnetic signal comprising a second code from the first apparatus, an analyzer for analyzing the second code, and a generator for, in response to an analysis of the second code, generating a parameter signal.

A receiver receives an electromagnetic signal comprising a second code from the first apparatus. An analyzer analyzes the second code. A generator generates a parameter signal in response to an analysis of the second code. Owing to the fact that the second code has been generated in the first apparatus after having analyzed the first code in the ultrasonic signal from the source, and owing to the fact that the second code is analyzed in the second apparatus, even more and/or more other purposes than location determination have become possible. The second apparatus may further comprise the source for producing the ultrasonic signal.

According to an embodiment, the second apparatus is defined by the parameter signal defining a registration issue and/or an authorization issue and/or an environmental issue and/or an analysis result. A registration issue may comprise a registration of a presence, working hours, parking time etc. An authorization issue may comprise an authorization for a payment, ingress/egress (building, room, computer) etc. An environmental issue may comprise an operation of a light, air conditioning, temperature etc. An analysis result may comprise a result from the analysis of the second code. The parameter signal may for example be supplied to an object, or may for example be supplied to the first apparatus that in response to a reception of the parameter signal may generate a further parameter signal that may be supplied to the object etc.

According to an embodiment, the second apparatus is defined by said analysis of the second code comprising a comparison. In a simple case, the second code is only compared with one or more other codes. In more advanced cases, the second code is processed and then compared with one or more other codes or the second code is compared with one or more other processed codes or the second code is processed and then compared with one or more other codes processed. A comparison may comprise one or more calculations of functions of one or more codes etc.

According to an embodiment, the second apparatus is defined by further comprising a controller for controlling the analyzer and/or the generator. In this case, the analyzer and/or the generator may be controlled for example in dependence of the second code and/or in dependence of another feature such as a date or a time etc.

According to an embodiment, the second apparatus is defined by further comprising a transmitter for, in response to a reception of the electromagnetic signal, transmitting a further electromagnetic signal comprising a third code to the first apparatus, the receiver being arranged for receiving a yet further electromagnetic signal comprising a fourth code from the first apparatus. Again, this for example allows a challenge-sign-response mechanism to be used for authentication purposes etc.

According to a sub-aspect, a second device comprising the second apparatus is provided. Such a second device may be a registration device for registering a presence, working hours, parking time etc. or may be an authorization device for authorizing a payment, ingress/egress (building, room, computer) etc. or may be an environmental device for operating a light, air conditioning, temperature etc. The second device may further comprise the source for producing the ultrasonic signal. The second device may also be a car, in which case the first apparatus or the first device can be a car key.

According to a further sub-aspect, a system comprising the first apparatus and/or comprising the first device and/or comprising the second apparatus and/or comprising the second device is provided. The system may further comprise the source for producing the ultrasonic signal.

According to a third aspect, a communication method is provided comprising the steps of at a first apparatus, receiving an ultrasonic signal comprising a first code from a source, analyzing the first code, and, in response to an analysis of the first code, controlling at least a part of the first apparatus, from the first apparatus to a second apparatus, transmitting an electromagnetic signal comprising a second code, and at the second apparatus, receiving the electromagnetic signal comprising the second code, analyzing the second code, and, in response to an analysis of the second code, generating a parameter signal.

An insight may be that when creating more and/or other purposes in a system comprising first and second apparatuses, the first apparatus does not necessarily need to be an informing apparatus only, and the second apparatus does not necessarily need to be a deciding apparatus only.

A basic idea may be that in a first apparatus, a first code of an ultrasonic signal is to be analyzed and in dependence of a first code analysis result at least a part of the first apparatus is to be controlled and in a second apparatus a second code of an electromagnetic signal is to be analyzed and in dependence of a second code analysis result a parameter signal is to be generated.

A problem to provide improved apparatuses that can be used for more and/or other purposes has been solved.

A further advantage may be that a user-friendliness of a registration and/or authorization system can be increased and/or that an energy consumption of an environmental system can be reduced.

These and other aspects of the invention are apparent from and will be elucidated with reference to the embodiment(s) described hereinafter.

DETAILED DESCRIPTION OF EMBODIMENTS

Figure 1:
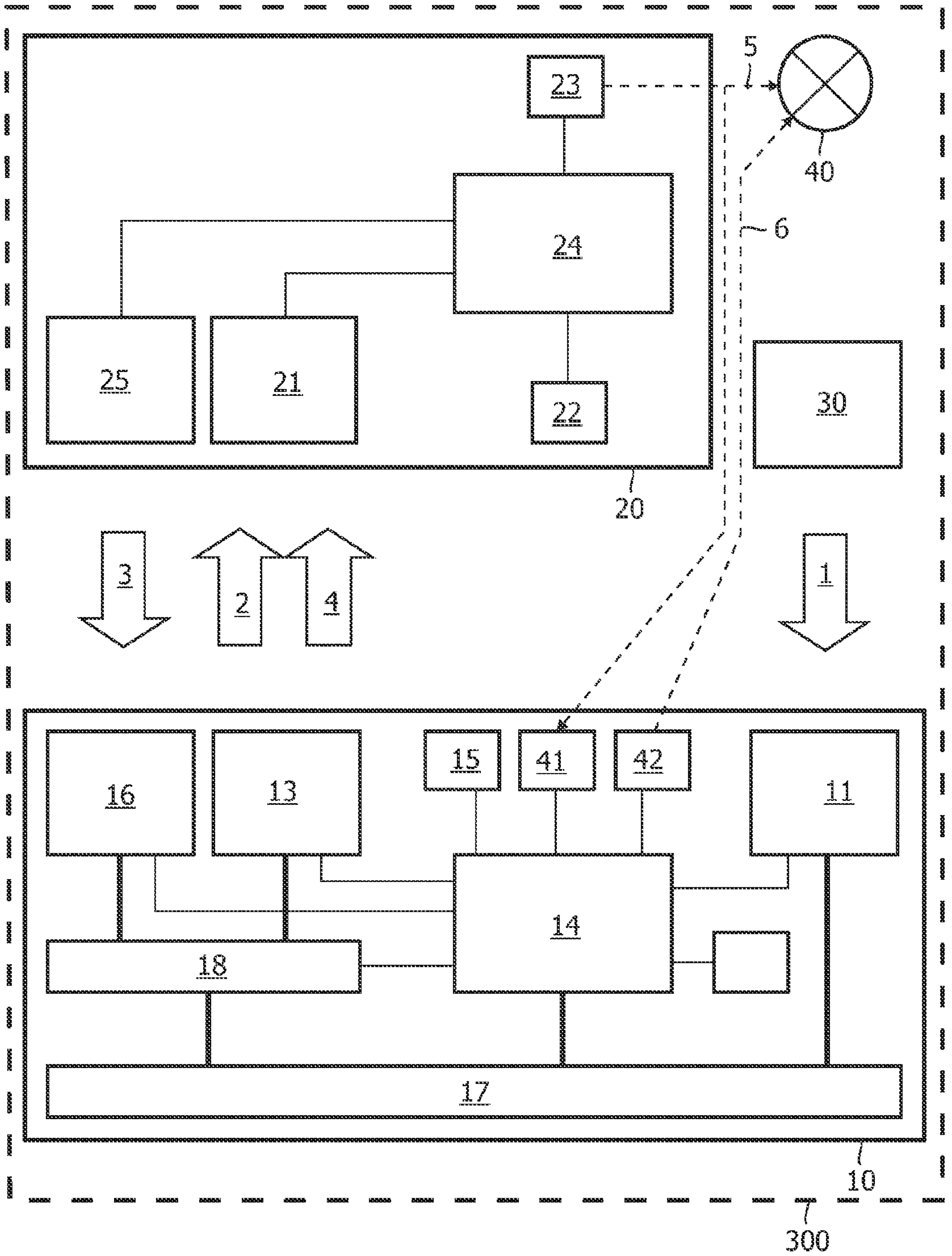
FIG. 1 shows a first embodiment of a system comprising a first apparatus and a second apparatus and a source.

In the FIG. 1 a first embodiment of a system 300 is shown comprising a first apparatus 10 and a second apparatus 20 and a source 30. The first apparatus 10 can communicate with the second apparatus 20 and comprises a receiver 11 for receiving an ultrasonic signal 1 comprising a first code from a source 30, an analyzer 12 for analyzing the first code, a transmitter 13 for, for example in response to a reception of the ultrasonic signal 1, transmitting an electromagnetic signal 2 comprising a second code to the second apparatus 20, and a controller 14 for, in response to an analysis of the first code, controlling at least a part of the first apparatus 10. Said analysis of the first code may for example comprise a comparison.

The first apparatus 10 may further for example comprise a supplier 15 for supplying the second code, in which case said controlling of at least the part of the first apparatus 10 may for example comprise a control of the supplier 15. The first apparatus 10 may further for example comprise a further receiver 16 for receiving a further electromagnetic signal 3 comprising a third code from the second apparatus 20, in which case the transmitter 13 may for example be arranged for, in response to a reception of the further electromagnetic signal 3, transmitting a yet further electromagnetic signal 4 comprising a fourth code to the second apparatus 20. The analyzer 12 may further be arranged for analyzing the third code.

The first apparatus 10 may further for example comprise a battery 17 for, via the (thicker) feeding lines, feeding the receiver 11 and the controller 14 and for feeding the transmitter 13 and the further receiver 16 via for example a switch 18. The controller 14 controls the receivers 11 and 16 and the transmitter 13 and the analyzer 12 and the supplier 15 and the switch 18, via the (thinner) controlling lines. In this case, said controlling of at least the part of the first apparatus 10 may for example comprise a control of a mode of the first apparatus 10. The first apparatus 10 may for example have at least a power saving mode (switch 18 deactivated) and a power consuming mode (switch 18 activated). Alternatively, said controlling of at least the part of the first apparatus 10 may for example comprise a control of the transmitter 13 for, in response to a reception of the ultrasonic signal 1, transmitting the electromagnetic signal 2 comprising the second code to the second apparatus 20.

The second apparatus 20 can communicate with the first apparatus 10 and comprises a receiver 21 for receiving the electromagnetic signal 2 comprising the second code from the first apparatus 10, an analyzer 22 for analyzing the second code, and a generator 23 for, in response to an analysis of the second code, generating a parameter signal 5. The parameter signal 5 may for example define a registration issue and/or an authorization issue and/or an environmental issue. In the FIG. 1, the parameter signal 5 for example controls an environmental issue in the form of a lamp 40. The analysis of the second code may for example comprise a comparison.

The second apparatus 20 may further for example comprise a controller 24 for controlling the analyzer 22 and/or the generator 23. The second apparatus 20 may further for example comprise a transmitter 25 for, in response to a reception of the electromagnetic signal 2, transmitting the further electromagnetic signal 3 comprising the third code to the first apparatus 10, in which case the receiver 21 may for example be arranged for receiving the yet further electromagnetic signal 4 comprising the fourth code from the first apparatus 10. The analyzer 22 may further be arranged for analyzing the fourth code. The controller 24 controls the receiver 21 and the transmitter 25 and the analyzer 22 and the generator 23, via the (thinner) controlling lines.

In the FIG. 1, the source 30 for producing the ultrasonic signal 1 is located outside the second apparatus 20. In the FIG. 2, a second embodiment of a system 300 is shown comprising a first apparatus 10 and a second apparatus 20. The second embodiment only differs from the first embodiment in that the second apparatus 20 comprises a supplier 26 for supplying the first code and/or the third code and comprises a source 27 for producing the ultrasonic signal 1 comprising the first code and in that the controller 24 can further advantageously control the supplier 26 and the source 27.

Figure 2:
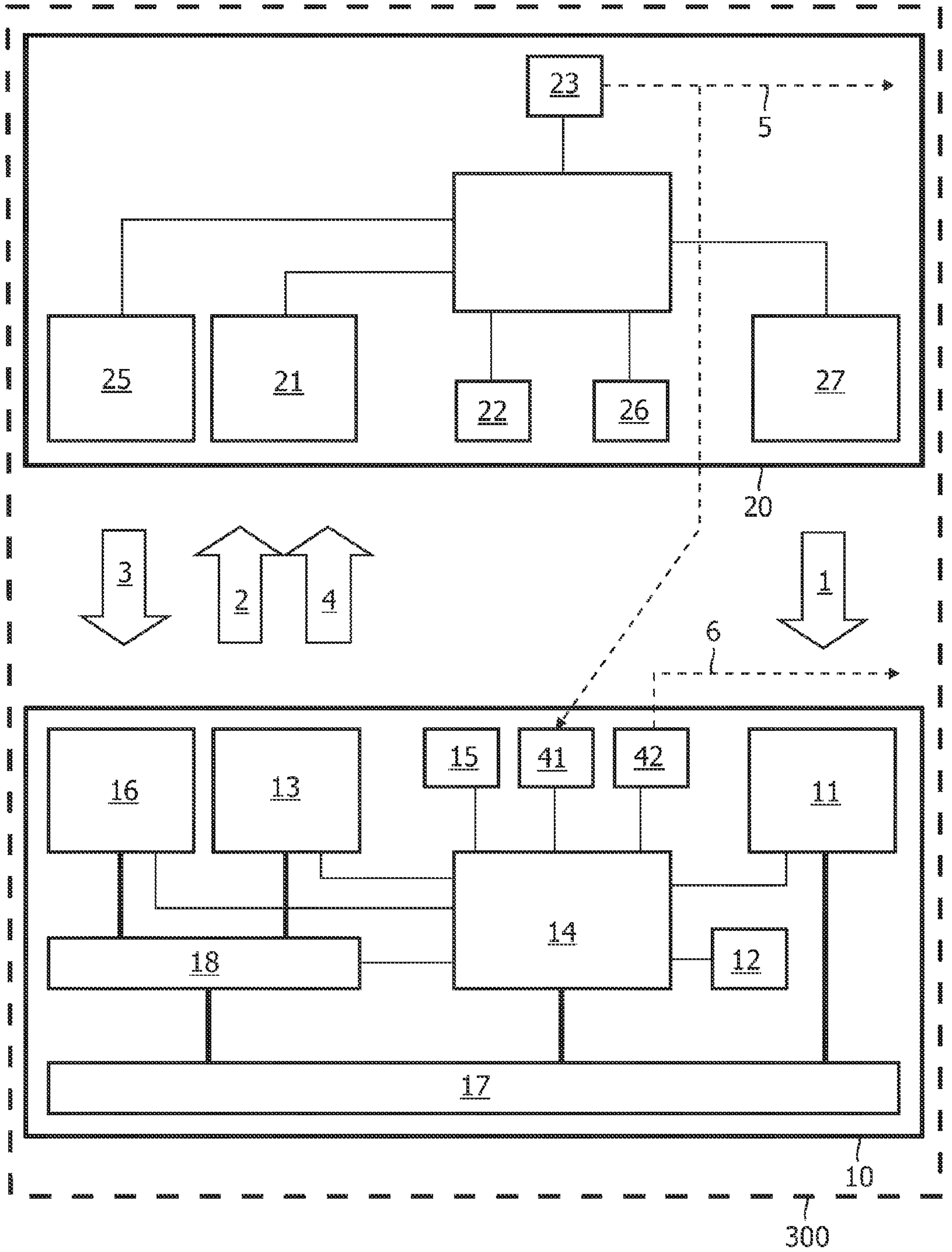
FIG. 2 shows a second embodiment of a system comprising a first apparatus and a second apparatus, the second apparatus comprising a source.

Alternatively, as also shown in the FIGS. 1 and 2, in the second apparatus 20, the generator 23 may generate the parameter signal 5 and may supply it to a yet further receiver 41 coupled to the controller 14 in the first apparatus 10. In response, the controller 14 may instruct a generator 42 to generate a further parameter signal 6 and to supply it to the lamp 40. The further parameter signal 6 may for example define a registration issue and/or an authorization issue and/or an environmental issue, just like the parameter signal 5. Further alternatively, in the second apparatus 20, the generator 23 may generate the parameter signal 5 and may supply it via the transmitter 25 to the further receiver 16 coupled to the controller 14 in the first apparatus 10. In response, the controller 14 may instruct a generator 42 to generate a further parameter signal 6 etc. Yet further alternatively, in the second apparatus 20, the generator 23 may generate the parameter signal 5 but now only comprising an analysis result and this is sent back to the first apparatus 10 via for example the transmitter 25 and the further receiver 16, in response to which the further parameter signal 6 is generated etc. So, each one of the generators 23 and 42 may comprise a transmitter or may be coupled to a transmitter, and each one of the parameter signals 5 and 6 may be a wired or wireless signal and may be a power supply signal or an internet signal or a signal comprising information or a link to this information etc.

Figure 3:
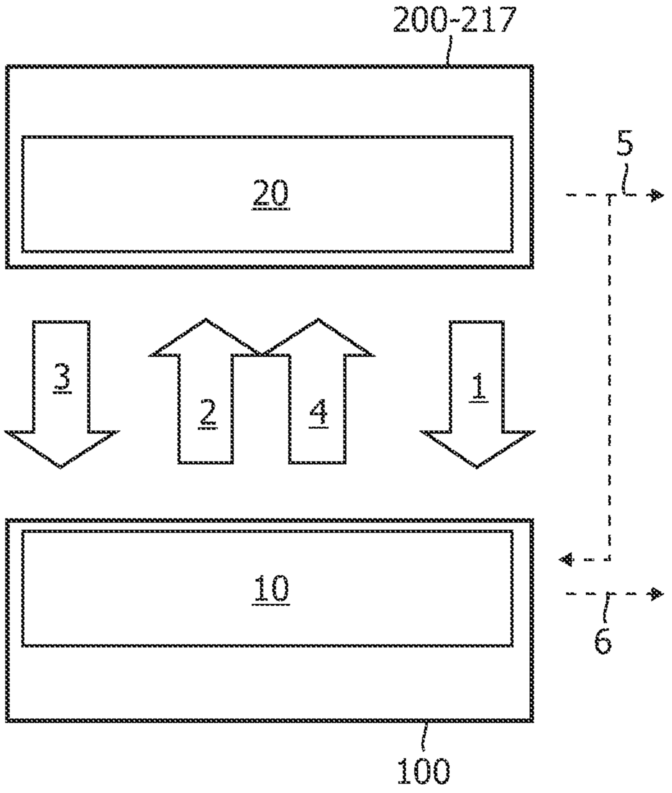
FIG. 3 shows a first device comprising a first apparatus and a second device comprising a second apparatus.

In the FIG. 3, a first device 100 comprising a first apparatus 10 and a second device 200-217 comprising a second apparatus 20 are shown.

Figure 4:
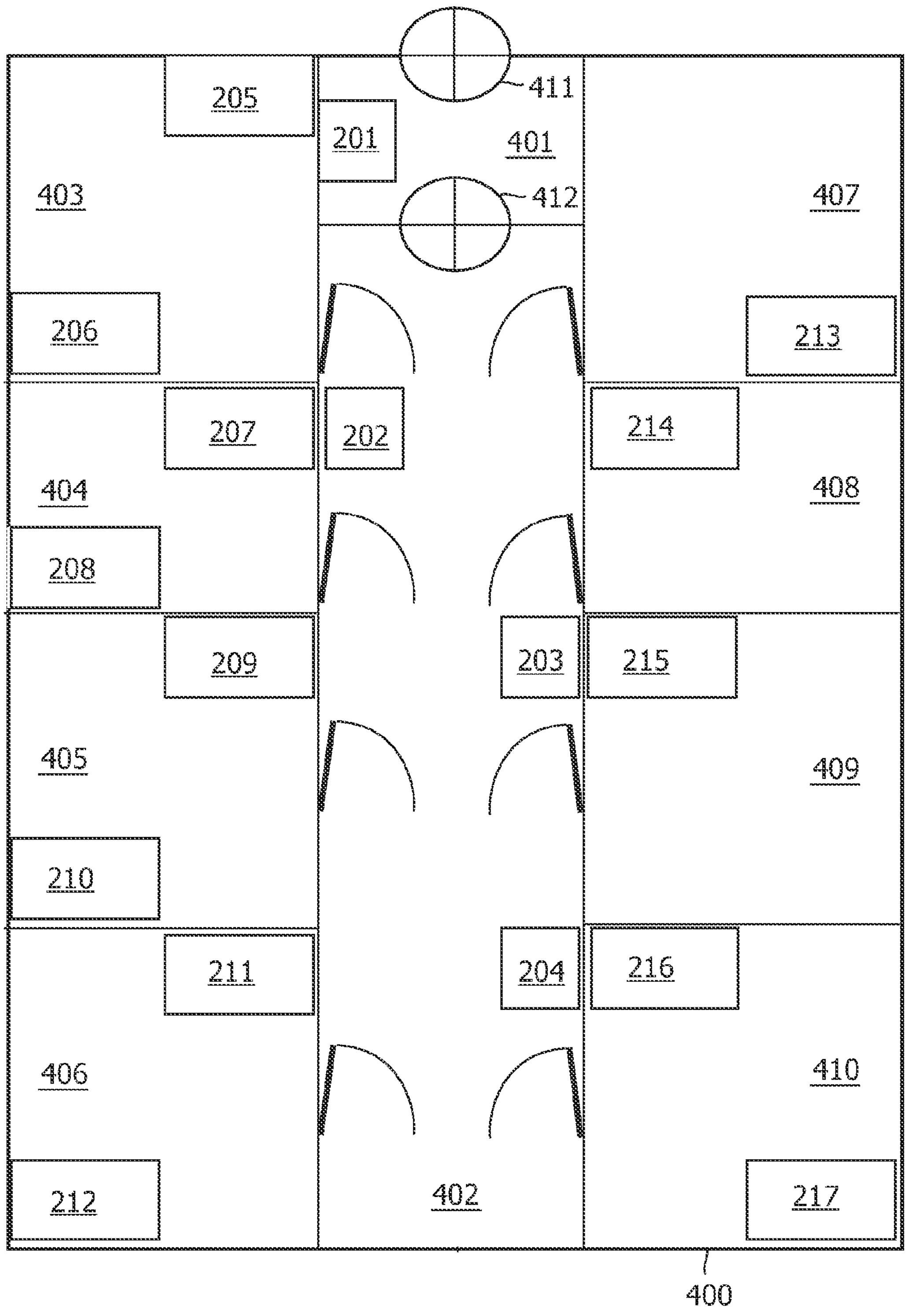
FIG. 4 shows a floor of a building comprising an entrance and a corridor and rooms each with one or more second devices.

In the FIG. 4, a floor 400 of a building comprising an entrance 401 and a corridor 402 and rooms 403-410 each with one or more second devices 201-217 is shown. The entrance 401 has two turning doors 411 and 412 and a second device 201. The turning door 411 gives access to the outside and the turning door 412 gives access to the corridor 402 and both turning doors give access to the entrance 401. The corridor 402 has three second devices 202-204 and eight normal doors that give access to the rooms 403-410. The room 403 has two second devices 205 and 206. The room 404 has two second devices 207 and 208. The room 405 has two second devices 209 and 210. The room 406 has two second devices 211 and 212. The room 407 has one second device 213. The room 408 has one second device 214. The room 409 has one second device 215. The 410 has two second devices 216 and 217.

The invention functions as follows. A user has a first apparatus 10 in the form of a tag etc. with him (or has a first device 100 in the form of a mobile phone, a wireless sensor device etc. comprising the tag etc. with him) and passes the first turning door 411 and enters the entrance 401. The second device 201 such as a station or an interface comprises the source 27 that produces an ultrasonic signal 1 comprising a first code A1. Such an ultrasonic signal, when being transmitted at a relatively high frequency with relatively low power, may for example have a reach of about one meter, and when being transmitted at a relatively low frequency with relatively high power, may for example have a reach of about ten to twenty meters, without a line of sight being required. Alternatively, the ultrasonic signal 1 comprising the first code A1 may originate from the source 30 located somewhere outside the second device 201.

In the first apparatus 10, the receiver 11 receives the ultrasonic signal 1 comprising the first code A1, and the analyzer 12 analyzes the first code A1. Thereto, the first code A1 is compared with one or more other codes or with one or more other processed codes, or the first code A1 is processed and then the processed first code is compared with one or more other codes or with one or more other processed codes, or the first code A1 is entered into one or more functions to calculate a function result that is to be compared with one or more other results, or the first code A1 and one or more other codes are entered into one or more functions to calculate a function result that is to be compared with one or more other results etc. Said processing and said functions may thereby depend on a feature such as a date or a time etc.

According to a first option, in response to an analysis result, in the first apparatus 10 the controller 14 controls at least a part of the first apparatus 10 such as for example a mode of the first apparatus 10. The first apparatus 10 has for example a power saving mode and a power consuming mode, and in response to the analysis result, the controller 14 activates the switch 18 such that the transmitter 13 and the further receiver 16 are coupled to the battery 17. As a result, the first apparatus 10 has been brought from a power saving mode into a power consuming mode, and the transmitter 13 can transmit an electromagnetic signal 2 comprising a second code A2 to the second device 201 comprising an apparatus 20. Other kinds of modes, such as a third mode, and other switching kinds, such as switching a clock speed of the controller 14, are not to be excluded. The apparatus 10 may return to a previous mode such as for example a power saving mode automatically after a time-interval or in response to another incoming ultrasonic signal or another incoming electromagnetic signal.

According to a second option, in response to an analysis result, in the first apparatus 10 the controller 14 controls at least a part of the first apparatus 10 such as for example the transmitter 13. The transmitter transmits the electromagnetic signal 2 comprising the second code A2 to the second device 201.

According to a third option, in response to an analysis result, in the first apparatus 10 the controller 14 controls at least a part of the first apparatus 10 such as for example the supplier 15. This supplier 15 supplies the second code A2 to the transmitter 13 for being transmitted as a part of the electromagnetic signal 2 to the second device 201.

In the second device 201, the receiver 21 receives the electromagnetic signal 2 comprising the second code A2, and the analyzer 22 analyzes the second code A2. Thereto, the second code A2 is compared with one or more other codes or with one or more other processed codes, or the second code A2 is processed and then the processed first code is compared with one or more other codes or with one or more other processed codes, or the second code A2 is entered into one or more functions to calculate a function result that is to be compared with one or more other results, or the second code A2 and one or more other codes are entered into one or more functions to calculate a function result that is to be compared with one or more other results etc. Said processing and said functions may thereby depend on a feature such as a date or a time etc.

In response to an analysis result, in the second device 201, the generator 23 generates a parameter signal 5. The parameter signal 5 defines for example a registration issue and/or an authorization issue, and in response to the parameter signal 5 for example a working hour registration is started and the turning door 412 is unlocked. The turning door 412 may be re-locked again automatically after a time-interval or when another parameter signal is received, for example from the second device 202 discussed further on.

According to a first option, in the second device 201, the controller 24 may control the analyzer 22 for example for introducing a dependency on a feature such as a date or a time etc. or another dependency and/or may control the generator 23 for example for introducing a dependency on a feature such as a date or a time etc. or another dependency etc.

According to a second option, in the second device 201, the transmitter 25 transmits a further electromagnetic signal 3 comprising a third code A3 to the first apparatus 10 in response to a reception of the electromagnetic signal 2. In the first apparatus 10, the further receiver 16 receives the further electromagnetic signal 3 comprising the third code A3 from the second device 201, and the transmitter 13 transmits a yet further electromagnetic signal 4 comprising a fourth code A4 to the second device 201 in response to a reception of the further electromagnetic signal 3. In the second device 201, the receiver 21 receives the yet further electromagnetic signal 4 comprising the fourth code A4 from the first apparatus 10. These additional electromagnetic signals 3 and 4 allow for example a challenge-sign-response mechanism to be used. Thereby, the third and fourth codes A3 and A4 may be analyzed and/or supplied as described for the second code A2.

Then the user passes the turning door 412 and enters the corridor 402. The second device 202 such as a station or an interface comprises the source 27 that produces an ultrasonic signal 1 comprising a first code B1. Alternatively, the ultrasonic signal 1 comprising the first code B1 may originate from the source 30 located somewhere outside the second device 202.

In the first apparatus 10, the receiver 11 receives the ultrasonic signal 1 comprising the first code B1, and the analyzer 12 analyzes the first code B1, possibly in dependence on a feature such as a date or a time etc. In response to an analysis result, the mode of the first apparatus 10 is controlled and/or the transmitter 13 is controlled and/or the supplier 15 is controlled such that an electromagnetic signal 2 comprising a second code B2 is transmitted to the second device 202.

In the second device 202, the receiver 21 receives the electromagnetic signal 2 comprising the second code B2, and the analyzer 22 analyzes the second code B2. In response to an analysis result, in the second device 202, the generator 23 generates a parameter signal 5. The parameter signal 5 defines for example an environmental issue, and in response to the parameter signal 5 for example a light in the corridor 402 is switched on. The light may be switched off automatically after a time-interval or when another parameter signal is received. Said analysis and/or said generation may depend on a feature such as a date or a time etc. The parameter signal 5 may further lock the turning door 412 again.

Then the user decides to get a cup of coffee and enters the room 403. The second device 205 such as a station or an interface comprises the source 27 that produces an ultrasonic signal 1 comprising a first code C1. Alternatively, the ultrasonic signal 1 comprising the first code C1 may originate from the source 30 located outside the second device 205. As described before, in the first apparatus 10, the receiver 11 receives the ultrasonic signal 1 comprising the first code C1 etc. and an electromagnetic signal 2 comprising a second code C2 is transmitted to the second device 205, and a light in the room 403 is switched on.

The second device 206 such as a coffee machine comprises the source 27 that produces an ultrasonic signal 1 comprising a first code D1. Alternatively, the ultrasonic signal 1 comprising the first code D1 may originate from the source 30 located outside the second device 206. As described before, in the first apparatus 10, the receiver 11 receives the ultrasonic signal 1 comprising the first code D1 etc. and an electromagnetic signal 2 comprising a second code D2 is transmitted to the second device 206, and a further electromagnetic signal comprising a third code D3 is transmitted to the first apparatus 10, and a yet further electromagnetic signal comprising a fourth code D4 is transmitted to the second device 206, and the cup of coffee is automatically billed.

The ultrasonic signal 1 comprising the first code D1 may be produced all the time or may be produced in response to the light being switched on or may be produced in response to a selection made by the user at the second device 206 etc. The first code D1 may comprise and/or define this selection, or the selection may be inserted into the second code D2 automatically owing to the fact that the user has programmed the first apparatus 10 properly, or the selection may be completely independent from the codes.

Then the user decides to start working and enters the room 404. The second device 207 such as a station or an interface comprises the source 27 that produces an ultrasonic signal 1 comprising a first code E1. Alternatively, the ultrasonic signal 1 comprising the first code E1 may originate from the source 30 located outside the second device 207. As described before, in the first apparatus 10, the receiver 11 receives the ultrasonic signal 1 comprising the first code E1 etc. and an electromagnetic signal 2 comprising a second code E2 is transmitted to the second device 207, and a light and an air-conditioning in the room 404 are switched on.

The second device 208 such as a personal computer comprises the source 27 that produces an ultrasonic signal 1 comprising a first code F1. Alternatively, the ultrasonic signal 1 comprising the first code F1 may originate from the source 30 located outside the second device 208. As described before, in the first apparatus 10, the receiver 11 receives the ultrasonic signal 1 comprising the first code F1 etc. and an electromagnetic signal 2 comprising a second code F2 is transmitted to the second device 208, and as a result the second device 208 can be accessed by the user. Thereto, possibly, third and fourth codes F3 and F4 may need to be exchanged.

The ultrasonic signal 1 comprising the first code F1 may be produced all the time or may be produced in response to the light being switched on or may be produced in response to a selection made by the user at the second device 208 etc. The first code F1 may comprise and/or define this selection, or the selection may be inserted into the second code F2 automatically owing to the fact that the user has programmed the first apparatus 10 properly, or the selection may be completely independent from the codes.

In case this user would enter the rooms 405 and 406 where colleagues work, the second devices 209 and 211 would turn on the light for this user but would for example not turn on the air-conditioning for this user and the second devices 210 and 212 such as personal computers would not give this user access.

In case this user would enter the room 407 such as a toilet or the room 408 such as a printing/copying room, the second devices 213 and 214 will turn on the light for this user. In the room 407, the second device 213 may further for example control the water and the air-conditioning. In the room 408, the second device 214 may further for example control an access to the printing/copying machines, for example in dependence of the user.

In case the user would like to enter the room 409 (410) where a boss works, the second device 203 (204) will not allow this and will not unlock the door to this room 409 (410). Thereto, the second device 203 (204), such as a station or an interface, comprises the source 27, that produces an ultrasonic signal 1 comprising a first code G1 (H1). Alternatively, the ultrasonic signal 1 comprising the first code G1 (H1) may originate from the source 30 located outside the second device 203 (204). As described before, in the first apparatus 10, the receiver 11 receives the ultrasonic signal 1 comprising the first code G1 (H1). But this time, according to a first option, in response to an analysis result in the first apparatus 10, an electromagnetic signal 2 comprising a second code G2 (H2) is not transmitted, and the door is not unlocked. Or, according to a second option, in response to an analysis result in the first apparatus 10, an electromagnetic signal 2 comprising a second code G2 (H2) is transmitted to the second device 203 (204), but in response to an analysis result in the second device 203 (204), the door is not unlocked. Thereto, possibly, third and fourth codes G3 (H3) and G4 (H4) may need to be exchanged too.

The ultrasonic signal 1 comprising the first code G1 (H1) may be produced all the time or may be produced in response to the light being switched on or may be produced in response to a selection made by the user at the second device 203 (204) etc.

When a boss having a different first apparatus 10 in the form of a tag etc. with him (or having a different first device 100 in the form of a mobile phone etc. comprising the tag etc. with him) wants to enter the room 409 (410), the second device 203 (204) will allow this and will unlock the door to this room 409 (410). Similarly, the second device 215 (216) such as an interface will switch on the light and the air-conditioning and the second device 217 such as a personal computer in room 410 will give this boss access.

In the FIG. 4, each second device may be replaced by a second apparatus located near and/or coupled to a station or an interface or a coffee machine or a personal computer etc. The entrance may be divided into a part for arriving people and a part for leaving people, each part having its own turning doors and apparatuses and/or devices. Each turning door may comprise one or more apparatuses and/or devices. Per room, one source for producing an ultrasonic signal may be present, or more than one source may be present. In case of more than one source per room being present, per room the sources may produce their own individual ultrasonic signals with individual first codes, or they may produce their own ultrasonic signals all with the same first code. The second apparatuses and/or the second devices may be coupled to a location system for determining locations of users, in which case each source will preferably have its own unique first code. The second code may then comprise the first code or a link to the first code and may then further comprise an identification of the tag, of the batch, of the mobile phone or of the user etc. This further allows a second apparatus or second device to discriminate between electromagnetic signals that are destined for this second apparatus or second device and electromagnetic signals that are not destined for this second apparatus or second device. A location system may count a number of people (or tags or batches or mobile phones etc.) per building and/or per room and for example change settings in response to a count result. Per room, a source may produce an ultrasonic signal having a certain power and a certain frequency and a certain direction to be able to distinguish several sources within the same room from each other. For example the second device in the entrance may need to be given a directional sensitivity to avoid unnecessary triggers. The ultrasonic signals may be produced all the time, for example once every predefined time interval, whereby a size of the predefined time interval may be adaptable or depend on a local situation. The ultrasonic signals may be produced in dependence of a date or a time or an amount of light or a temperature etc. or in dependence of another trigger such as a light being switched on or a coffee selection being made or a user entering a pin code etc. Such a pin code may further need to be entered into one or more apparatuses and/or into one or more devices after a reception of a signal and/or before a transmission of a signal. The apparatuses and/or the devices may be provided with a further positioning system such as a global positioning system etc. Per apparatus, a switch and/or an analyzer and/or a supplier and/or a generator may be integrated into and/or form part of a controller. A controller may be a processor with software or may be a processor with software plus hardware or may be fully hardware. Each option can be combined with any other option and the electromagnetic signals comprising the third and fourth codes are embodiments only. The second devices may alternatively comprise a suitcase or a cupboard, closet, wardrobe etc. that can be automatically locked and unlocked. Each first and second device may be a memory stick or a laptop etc. The FIG. 4 embodiment may alternatively be used for a hospital (patient individualization), a sales room/building (customer individualization), a gaming room/hall (gamer individualization), a home for aged persons (aged person individualization) etc. (in general: person individualization and/or object individualization).

Summarizing, first apparatuses 10 such as tags and batches comprise receivers 11 for receiving ultrasonic signals 1 comprising first codes from sources 27, 30, analyzers 12 for analyzing first codes, transmitters 13 for transmitting electromagnetic signals 2 comprising second codes to second apparatuses 20, and controllers 14 for, in response to analyses of first codes, controlling at least parts of the first apparatuses 10, such as modes, transmissions, and supplies of second codes. Second apparatuses 20 such as parts of interfaces and parts of stations comprise receivers 21 for receiving the electromagnetic signals 2 comprising second codes from the first apparatuses 10, analyzers 22 for analyzing second codes, and generators 23 for, in response to analyses of second codes, generating parameter signals 5 defining issues like registration issues and authorization issues and environmental issues, and analysis results. The first apparatuses 10 may form part of first devices 100 such as mobile phones and organizers, and the second apparatuses 20 may form part of second devices 200 such as interfaces and stations.

While the invention has been illustrated and described in detail in the drawings and foregoing description, such illustration and description are to be considered illustrative or exemplary and not restrictive; the invention is not limited to the disclosed embodiments. For example, it is possible to operate the invention in an embodiment wherein different parts of the different disclosed embodiments are combined into a new embodiment.

Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. A single processor or other unit may fulfill the functions of several items recited in the claims. The mere fact that certain measures are recited in mutually different dependent claims does not indicate that a combination of these measured cannot be used to advantage. A computer program may be stored/distributed on a suitable medium, such as an optical storage medium or a solid-state medium supplied together with or as part of other hardware, but may also be distributed in other forms, such as via the Internet or other wired or wireless telecommunication systems. Any reference signs in the claims should not be construed as limiting the scope.

The invention claimed is:

1. A system comprising a first apparatus for communication with a second apparatus, the first apparatus comprising
- a receiver for receiving an ultrasonic signal comprising a first code from a source,
- an analyzer for analyzing the first code,
- a transmitter for transmitting a first electromagnetic signal comprising a second code to the second apparatus, and
- a controller for, in response to an analysis of the first code, controlling at least a part of the first apparatus; and
- the second apparatus comprising
  - a receiver for receiving the first electromagnetic signal comprising the second code from the first apparatus,
  - an analyzer for analyzing the second code,
  - a generator for, in response to an analysis of the second code, generating a parameter signal; and
  - a transmitter for, in response to a reception of the electromagnetic signal, transmitting a second electromagnetic signal comprising a third code to the first apparatus, the receiver being arranged for receiving a third electromagnetic signal comprising a fourth code from the first apparatus.

2. The system as claimed in claim 1, said controlling of at least the part of the first apparatus comprising a control of a mode of the first apparatus, the first apparatus having at least a power saving mode and a power consuming mode.

3. The system as claimed in claim 1, said controlling of at least the part of the first apparatus comprising a control of the transmitter for, in response to a reception of the ultrasonic signal, transmitting the electromagnetic signal comprising the second code to the second apparatus.

4. The system as claimed in claim 1, further comprising a supplier for supplying the second code, said controlling of at least the part of the first apparatus comprising a control of the supplier, said second code comprising at least one of an identification code, the first code, a link to the first code and/or an analysis result.

5. The system as claimed in claim 1, said analysis of the first code comprising a comparison.

6. The system as claimed in claim 1, wherein the parameter signal defines a registration issue and/or an authorization issue and/or an environmental issue and/or an analysis result.

7. The system as claimed in claim 1, wherein the analysis of the second code comprises a comparison.

8. The system as claimed in claim 1, wherein the second apparatus comprises a controller for controlling the analyzer and/or the generator.

9. A communication method comprising the steps of
at a first apparatus, receiving an ultrasonic signal comprising a first code from a source, analyzing the first code, and, in response to an analysis of the first code, controlling at least a part of the first apparatus,
from the first apparatus to a second apparatus, transmitting an electromagnetic signal comprising a second code, and
at the second apparatus, receiving the electromagnetic signal comprising the second code, analyzing the second code, in response to an analysis of the second code, generating a parameter signal, and, in response to a reception of the electromagnetic signal, transmitting a second electromagnetic signal comprising a third code to the first apparatus, the receiver being arranged for receiving a third electromagnetic signal comprising a fourth code from the first apparatus.

10. A system comprising a first apparatus for communication with a second apparatus, the first apparatus comprising:
a receiver for receiving an ultrasonic signal comprising a first code from a source, an analyzer for analyzing the first code,
a transmitter for transmitting an electromagnetic signal comprising a second code to the second apparatus, and
a controller for, in response to an analysis of the first code, controlling at least a part of the first apparatus; and the second apparatus comprising:
a receiver for receiving a first electromagnetic signal comprising a second code from the first apparatus,
an analyzer for analyzing the second code,
a generator for, in response to an analysis of the second code, generating a parameter signal; and
a transmitter for, in response to a reception of the electromagnetic signal, transmitting the parameter signal to an object, wherein the parameter signal is configured to control the object, transmitting a second electromagnetic signal comprising a third code to the first apparatus; and wherein the receiver is arranged for receiving a third electromagnetic signal comprising a fourth code from the first apparatus.

11. The communication system of claim 10, wherein the transmitter of the second apparatus is configured to transmit the parameter signal to the first apparatus.

12. The communication system of claim 10, wherein the first apparatus comprises a generator connected to the controller, wherein the generator is configured to generate a further parameter signal and the transmitter is configured to transmit the further control signal to the object.

13. The system as claimed in claim 10, wherein the parameter signal defines a registration issue and/or an authorization issue and/or an environmental issue and/or an analysis result.

14. A communication method comprising the steps of at a first apparatus, receiving an ultrasonic signal comprising a first code from a source, analyzing the first code, and, in response to an analysis of the first code, controlling at least a part of the first apparatus,
from the first apparatus to a second apparatus, transmitting an electromagnetic signal comprising a second code, and
at the second apparatus, receiving the electromagnetic signal comprising the second code, analyzing the second code,
in response to an analysis of the second code, generating a parameter signal, transmitting the parameter signal to an object, wherein the parameter signal is configured to control the object, transmitting a second electromagnetic signal comprising a third code to the first apparatus; and further comprising the step receiving a third electromagnetic signal comprising a fourth code from the first apparatus.

* * * * *